United States Patent [19]

Hagbjer

[11] 4,450,195

[45] May 22, 1984

[54] HYGIENIC ABSORBENT AND USE OF A PLASTIC FOIL IN THE ABSORBENT

[75] Inventor: Gunnar Hagbjer, Malmö, Sweden

[73] Assignee: IFM Akustikbyran AB, Stockholm, Sweden

[21] Appl. No.: 221,693

[22] PCT Filed: May 9, 1980

[86] PCT No.: PCT/SE80/00137

§ 371 Date: Dec. 31, 1980

§ 102(e) Date: Dec. 31, 1980

[87] PCT Pub. No.: WO80/02580

PCT Pub. Date: Nov. 27, 1980

[30] Foreign Application Priority Data

May 11, 1979 [SE] Sweden ................ 7904166

[51] Int. Cl.³ ................ B32B 3/12

[52] U.S. Cl. ................ 428/178; 181/288; 428/138

[58] Field of Search ................ 428/178, 130, 138; 181/284, 292, 288

[56] References Cited

U.S. PATENT DOCUMENTS

| | | | |
|---|---|---|---|
| 798,804 | 9/1905 | Kunz | 428/178 X |
| 3,384,199 | 5/1968 | Eckel | 181/290 |
| 3,415,711 | 12/1968 | Chavannes | 428/166 |
| 3,812,001 | 5/1974 | Ryan | 428/178 |
| 3,887,031 | 6/1975 | Wirt | 428/178 X |
| 3,948,347 | 4/1976 | Rutledge | 428/130 X |
| 4,076,872 | 2/1978 | Lewicki | 428/178 X |
| 4,356,642 | 11/1982 | Herman | 428/178 X |

FOREIGN PATENT DOCUMENTS

| | | |
|---|---|---|
| 2046588 | 3/1972 | Fed. Rep. of Germany . |
| 2719411 | 11/1978 | Fed. Rep. of Germany . |
| 1580917 | 9/1969 | France . |
| 402142 | 6/1978 | Sweden . |

*Primary Examiner*—Henry F. Epstein
*Attorney, Agent, or Firm*—Griffin, Branigan & Butler

[57] ABSTRACT

A hygienic absorbent, i.e. a substantially liquid and gas tight sound absorbent, including an under-absorbent (11), a tight foil (13) and gas-filled blisters (15) located therebetween. Preferably a supporting layer (16) is located outside the under-absorbent to support the blisters (15).

7 Claims, 5 Drawing Figures

HYGIENIC ABSORBENT AND USE OF A PLASTIC FOIL IN THE ABSORBENT

The present invention concerns a hygienic absorbent. Thereby is meant a substantially liquid and gas tight sound absorbent.

For reduction of airborne disturbing noise in premises, free hard surfaces are generally provided with a suitable sound absorbent. In most cases an air-permeable absorbent of e.g. mineral wool is used. A great variety of such conventional absorbents having good acoustical absorption ability is commercially available. They can at need be provided with a protective surface layer of air-permeable material, e.g. staple fibres, woven material, perforated sheet metal etc., without the sound absorbing ability being appreciably varied.

In those cases where there is a requirement to e.g. flush water in order to clean a room, e.g. premises for handling food products, absorbents must be provided with a tight facing layer, e.g. of plastic or aluminum foil, which should have a smooth surface in order to reduce the risk of hiding-places for dirt and microbes and in order to be readily cleanable. Such a facing layer, however, causes a substantial declination of the absorption ability of the absorbent. This is true within the whole frequency range from 100 Hz to 4000 Hz. Especially in the lower frequency range, i.e. frequencies below 500 Hz, the absorption ability becomes insignificant. An absorbent with a facing layer of the kind stated furthermore provides poor resistance against mechanical influence.

The demand for hygienic absorbents is great on the market. This is especially the case in the food products field, such as dairies, catering kitchens, dining halls etc., but also in other fields where the hygiene requirements are not that essential. This can be the case in premises with high air humidity, e.g. turbine halls in power stations and the like, or premises where grease and dust rapidly clog mineral wool absorbents, e.g at cleaning of machine parts with hot water or compressed air.

The object of the present invention is to provide a so called hygienic absorbent which has a high absorption ability with a wide frequency range and is provided with a tight, preferably water-proof, facing layer. The hygienic absorbent ability according to the invention shall have high absorption ability within the frequency range from 100 Hz–4000 Hz, be readily cleanable by e.g. flushing, have good mechanical resistance and be free from cavities (and the risk of colonies of bacteria).

These objects are achieved in that the hygienic absorbent according to the present invention has been given the characteristics of the annexed claims.

BRIEF DESCRIPTION OF THE DRAWINGS

The invention will now be described under reference to the accompanying drawings, wherein.

Figure 3:
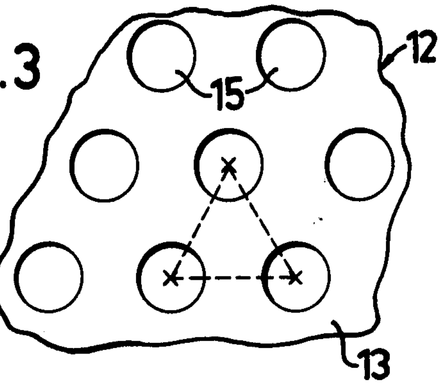
FIG. 3 shows an example of a facing or covering layer.
Figure 1:
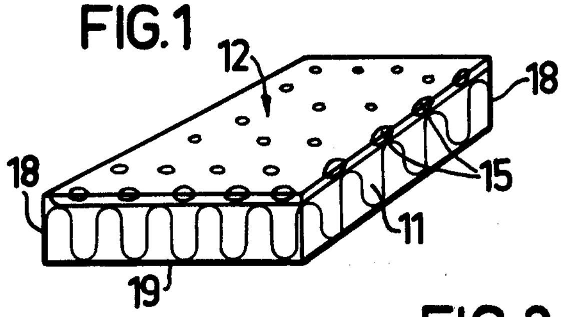
FIG. 1 is a perspective view showing a cut-out portion of a hygienic absorbent according to the invention.

A hygienic absorbent according to the invention comprises at least one under-absorbent 11 and a tight surface layer 12 resting on the under-absorbent 11 by means of gas-filled cushions or blisters 15 (FIG. 1). The under-absorbent 11, which may be a conventional mineral wool absorbent or the like, shall have such firm surface that the cushions 15 without appreciably sinking into the absorbent rest against said surface. Ordinary absorbents generally have no such surface, and, therefore, according to the preferred embodiment of the invention shown in FIG. 2, a supporting layer 16 is disposed on the under-absorbent 11 such that it supports the surface layer 12. The supporting layer 16 is over substantially its entire area provided with bores 17 or is in any other way perforated, e.g. by comprising a net of suitable material or expanded metal. The distribution of the bores 17 or other perforations may be arbitrary, but is suitably—especially for manufacturing reasons—regular.

The surface layer 12 suitably consists of a plastic foil 13 which at its under-side is connected to another plastic foil 14 such that distributed blisters 15 are formed. The whole aggregate 13, 14 may be of the known type used for packing fragile objects. As examples of configurations of the aggregate 13, 14 which have turned out operating satisfactorily, such can be mentioned where the blisters had circular shape, their diameters were about 9–10 mm and about 25 mm, respectively, their centers were located at the angles of equilateral triangles having 11 mm and 28 mm side-length, respectively, and their heights (thicknesses) were 3 mm and 12 mm, respectively. The larger blisters were effective within a lower frequency range than the smaller ones.

As an alternative to circular shape the blisters may be oval. Blisters having different diameters may alternatingly exist on one and the same surface layer 12. In such case, however, the height (thickness) of all blisters is suitably equal. The foil thickness is preferably 0.025–0.03 mm.

The surface layer 12 may either lie loose against the supporting layer or be glued to same.

As an alternative to the embodiment of the surface layer 12 shown and described a surface layer could be contemplated comprising the tight foil 13 and separate blisters or cushions, which are glued or otherwise attached to the foil 13. Such blisters do not either have to have equal size (have equal volume), but the size may vary.

Figure 2:
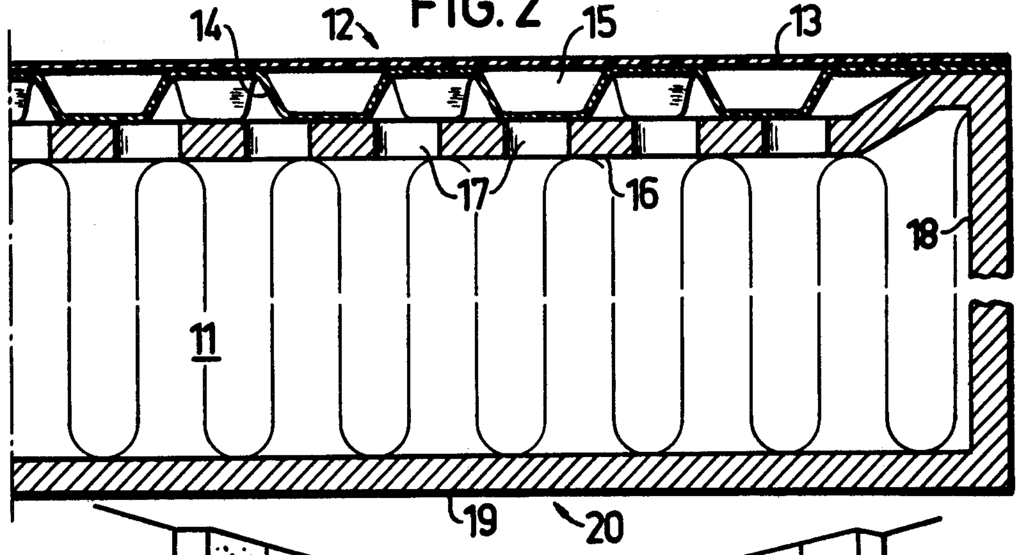
FIG. 2 shows at a larger scale a cross-section through a preferred embodiment of the hygienic absorbent according to the invention.

As to some extent appears from FIG. 2, the perforation of the supporting layer does not have to correspond with the location of the blisters 15 or the spaces therebetween, but these relations may be entirely at random. The blisters may not, however, sink into the perforations, but must be supported by the supporting layer 16. The perforations, e.g. the bores 17, thus, may not have such wide openings that the blisters 15 can be accomodated therein. The thickness of the supporting layer—and especially the height of the bores 17 or corresponding openings in for instance a net—shall not exceed 1 mm.

Figure 4:
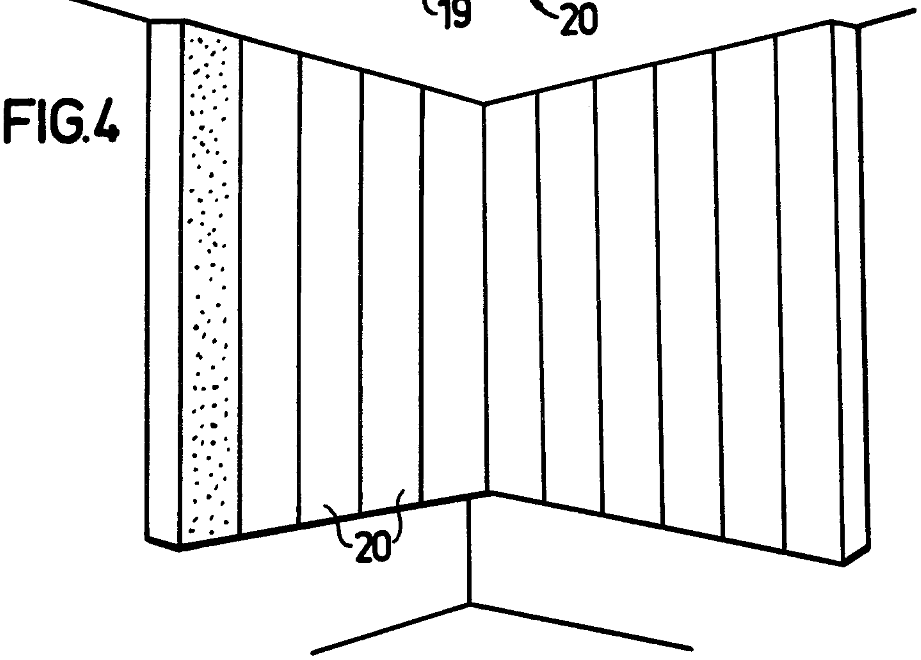
FIG. 4 shows a corner of a room provided with hygienic absorbents according to the invention.

The supporting layer 16, which may be of sheet metal or other suitable material, is integral with, or, attached to the walls 18 and bottom 19 of a box-like coffer 20, in which the under-absorbent 11 is accomodated and which for instance may have the shapes that appear from FIG. 4, wherein several hygienic absorbents according to the invention are adapted onto two walls of a room. In this case the joints between the individual coffers 20 are sealed by e.g. tapeing or sealing strips.

For free suspension from a ceiling a coffer is suitably on both sides provided with a perforated supporting layer 16 and a superposed surface layer 12.

Figure 5:
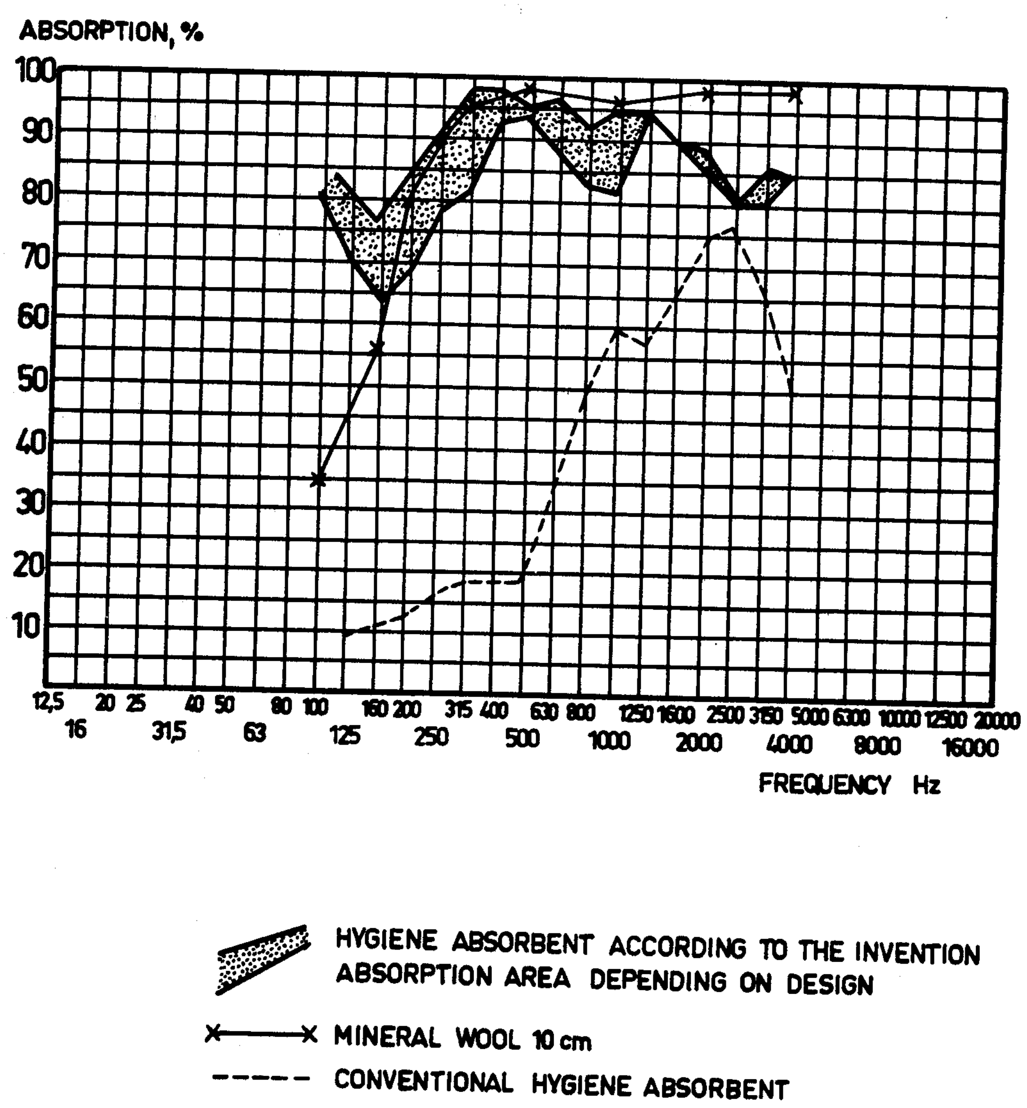
FIG. 5 shows a diagram from which the absorption of the hygienic absorbent according to the invention appears in comparison with known absorbents.

As appears from the diagram of FIG. 5, the hygienic absorbent according to the present invention provides considerably better absorption than a commercially available hygienic absorbent, and substantially as good absorption (not audible differences) as a pure mineral absorbent.

I claim:

1. A hygienic sound absorbent comprising:
   a layer of sound absorbing material;
   a tight surface layer having at least a portion thereof connected to said layer of sound absorbing material;
   means for defining a plurality of mutually-spaced, gas-filled cushions or blisters located between said tight surface layer and said layer of sound-absorbing material to thereby space said tight-surface layer from said sound-absorbing material, at least a portion of said cushion-defining means being connected to said tight surface layer, at least some of said gas-filled cushions or blisters being sized in accordance with the frequency-range of the sounds that are to be absorbed.

2. The hygienic sound absorbent of claim 1 including a perforated supporting layer between said cushions or blisters and said layer of sound-absorbing material, said perforated supporting layer being operative to support said cushions or blisters.

3. The hygienic sound absorbent of claim 2 including a coffer for holding said layer of sound absorbing material and wherein said perforated supporting layer forms a wall of said coffer.

4. The hygienic sound absorbent of claims 1 or 2 or 3 wherein said tight surface layer comprises a foil; and, said mutually-spaced, gas-filled cushions or blisters are also formed in a foil layer adhered to the underside of said tight surface layer.

5. The hygienic sound absorbent of claim 1 wherein the tight surface layer is comprised of a smooth plastic and the cushions or blisters are formed in a foil layer having portions thereof between said blisters or cushions tightly attached to the underside of said surface layer.

6. The hygienic sound absorbent of claim 1 wherein said cushions or blisters are supported adjacent said layer of sound-absorbing material by a supporting layer of perforated metal.

7. The hygienic sound absorbent of claim 1 wherein the sizes of said blisters or cushions are in accordance with the frequency-range of the sounds that are to be absorbed.

* * * * *